US012028843B2

United States Patent
Hirata et al.

(10) Patent No.: US 12,028,843 B2
(45) Date of Patent: Jul. 2, 2024

(54) COMMUNICATION APPARATUS AND COMMUNICATION METHOD

(71) Applicant: Sony Group Corporation, Tokyo (JP)

(72) Inventors: Ryuichi Hirata, Tokyo (JP); Yusuke Tanaka, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 363 days.

(21) Appl. No.: 17/430,729

(22) PCT Filed: Jan. 15, 2020

(86) PCT No.: PCT/JP2020/001026
§ 371 (c)(1),
(2) Date: Aug. 13, 2021

(87) PCT Pub. No.: WO2020/195029
PCT Pub. Date: Oct. 1, 2020

(65) Prior Publication Data
US 2022/0124712 A1  Apr. 21, 2022

(30) Foreign Application Priority Data
Mar. 27, 2019  (JP) ................ 2019-059860

(51) Int. Cl.
*H04W 72/0453* (2023.01)
*H04L 5/00* (2006.01)
*H04W 74/0816* (2024.01)

(52) U.S. Cl.
CPC ... *H04W 72/0453* (2013.01); *H04W 74/0816* (2013.01); *H04L 5/0005* (2013.01)

(58) Field of Classification Search
CPC .......... H04L 5/0005; H04L 5/0092; H04W 74/0816; H04W 72/0453; H04W 84/12
See application file for complete search history.

(56) References Cited

U.S. PATENT DOCUMENTS

2007/0297353 A1* 12/2007 Habetha ............. H04W 40/244
                                                    370/310
2012/0182963 A1*  7/2012 Kneckt ............. H04W 72/0453
                                                    370/330
(Continued)

FOREIGN PATENT DOCUMENTS

JP    2007511972 A    5/2007
JP    2015-115613 A    6/2015
(Continued)

OTHER PUBLICATIONS

International Search Report and Written Opinion dated Apr. 14, 2020, received for PCT Application PCT/JP2020/001026, Filed on Jan. 15, 2020, 9 pages including English Translation.

*Primary Examiner* — Oussama Roudani
(74) *Attorney, Agent, or Firm* — XSENSUS LLP

(57) ABSTRACT

Provided is a communication apparatus which performs data communication by bundling multiple bands.
The communication apparatus includes a communication section that performs transmission and reception of a wireless signal by using multiple bands, and a control section that controls communication operation of the communication section. The control section performs control such that, after a transmission right has been acquired in a first band, a first signal is transmitted in the first band before a transmission right is acquired in a second band. The control section also performs control such that, when the transmission rights are acquired in both the first band and the second band, data transmission is performed by using the first band and the second band simultaneously. An RTS frame, a CTS frame, a data frame, a busy tone, or the like is transmitted as the first signal.

17 Claims, 13 Drawing Sheets

(56) References Cited

U.S. PATENT DOCUMENTS

| | | | | |
|---|---|---|---|---|
| 2016/0192397 A1* | 6/2016 | Kim | ................. | H04W 74/0816 |
| | | | | 370/336 |
| 2018/0368185 A1* | 12/2018 | Choi | ................... | H04W 52/143 |
| 2020/0100326 A1* | 3/2020 | Bendlin | ................ | H04W 88/06 |

FOREIGN PATENT DOCUMENTS

| | | | |
|---|---|---|---|
| JP | 2018-78447 | A | 5/2018 |
| JP | 2018-157535 | A | 10/2018 |
| JP | 2018-170621 | A | 11/2018 |
| JP | 2019-157535 | A | 9/2019 |
| WO | 2015/146340 | A1 | 10/2015 |

\* cited by examiner

COMMUNICATION APPARATUS AND COMMUNICATION METHOD

CROSS-REFERENCE TO RELATED APPLICATIONS

The present application is based on PCT filing PCT/JP2020/001026, filed Jan. 15, 2020, which claims priority to JP 2019-059860, filed Mar. 27, 2019, the entire contents of each are incorporated herein by reference.

TECHNICAL FIELD

The technology disclosed in the present specification relates to a communication apparatus and a communication method for transmitting and receiving a wireless signal.

BACKGROUND ART

In recent years, the utilization of a wireless LAN (Local Area Network) in VR (Virtual Reality) and so forth is expected. In order to cope with such utilization, improvement of the peak throughput is needed. As one of technologies for improving the peak throughput, carrier aggregation in which multiple frequency bands are used at the same time to secure a wideband is paid attention to as a next-generation wireless LAN standard.

For example, there is proposed a wireless communication apparatus in which, in a case where communication is performed in parallel at the same time in multiple frequency bands that are separate from each other, transmission data is mapped in the multiple frequency bands and power distribution is then performed for each frequency band to determine a modulation and channel coding scheme and a transmission bandwidth (refer to PTL 1).

Also, there is proposed a wireless communication apparatus in which a channel situation is observed, carrier-sense is carried out on a channel and a medium that are predicted to be idle, and transmission is then performed in multiple bands at the same time on the basis of a result of the carrier-sense (refer to PTL 2).

CITATION LIST

Patent Literature

[PTL 1]
  Japanese Patent Laid-Open No. 2018-157535
[PTL 2]
  Japanese Patent Laid-Open No. 2018-78447

SUMMARY

Technical Problem

The object of the technology disclosed in the present specification resides in provision of a communication apparatus and a communication method that bundle multiple bands to perform data communication.

Solution to Problem

According to a first aspect of the technology disclosed in the present specification, there is provided a communication apparatus including:
  a communication section that performs transmission and reception of a wireless signal by using multiple bands; and
  a control section that controls communication operation of the communication section, in which
  the control section performs control such that, after a transmission right has been acquired in a first band, a first signal is transmitted in the first band before a transmission right is acquired in a second band.

The control section performs control such that information regarding transmission right acquisition in another band is included in the first signal.

Further, the control section performs control such that, when the transmission rights are acquired in both the first band and the second band, data transmission is performed by using the first band and the second band simultaneously.

An RTS frame, a CTS frame, a data frame, a busy tone, or the like is transmitted as the first signal.

Further, according to a second aspect of the technology disclosed in the present specification, there is provided a communication method for a communication apparatus that performs transmission and reception of a wireless signal by using multiple bands, the communication method including:
  a step of acquiring a transmission right in a first band;
  a step of transmitting a first signal in the first band before a transmission right is acquired in a second band; and
  a step of performing data transmission by simultaneously using the first band and the second band when the transmission rights are acquired in both the first band and the second band.

Further, according to a third aspect of the technology disclosed in the present specification, there is provided a communication apparatus including:
  a communication section that performs transmission and reception of a wireless signal by using multiple bands; and
  a control section that controls communication operation of the communication section, in which
  the control section performs control such that, after a first signal has been received in the first band, data transmitted by simultaneously using the first band and the second band is received.

Further, according to a fourth aspect of the technology disclosed in the present specification, there is provided a communication method for a communication apparatus that performs transmission and reception of a wireless signal by using multiple bands, the communication method including:
  a step of receiving a first signal in a first band; and
  a step of receiving data transmitted by using the first band and a second band simultaneously.

Advantageous Effect of Invention

With the technology disclosed in the present specification, it is possible to provide a communication apparatus and a communication method in which, while a band holds the transmission right that has been acquired, the transmission right is acquired in another band and multiple bands are then bundled to perform data communication.

It is to be noted that the effect described in the present specification is exemplary and that the effect brought by the technology disclosed in the present specification is not limited thereto. Further, in some cases, the technology disclosed in the present specification demonstrates not only the effect described above but also further additional effects.

Further objects, features, and advantages of the technology disclosed in the present specification will become apparent from detailed descriptions based on an embodiment to be described later and accompanying drawings.

DESCRIPTION OF EMBODIMENT

In the following, an embodiment of the technology disclosed in the present specification is described in detail with reference to the drawings.

The present applicant believes that, in order to perform data transmission in multiple bands at the same time, there are two problems. One of the problems is that, after the transmission right is acquired in a certain band but before the transmission right is acquired in another band, if another terminal starts transmission, transmission cannot be performed in the band in which the transmission right is acquired first. The other problem is that there is unnecessary waiting time after the transmission right is acquired in a certain band until the transmission right is acquired in another band.

Therefore, in the present specification, there is proposed below a technology in which a signal is transmitted in a band that has already acquired the transmission right, to maintain the transmission right until the transmission right is acquired in the other band. The signal to be transmitted in the band in which the transmission right is acquired first may be a frame such as RTS (Request To Send) or CTS (Clear To Send) that includes information for making another terminal wait to transmit data, or may be a signal such as a busy tone for making another terminal wait to transmit data due to detection of power.

Figure 1:
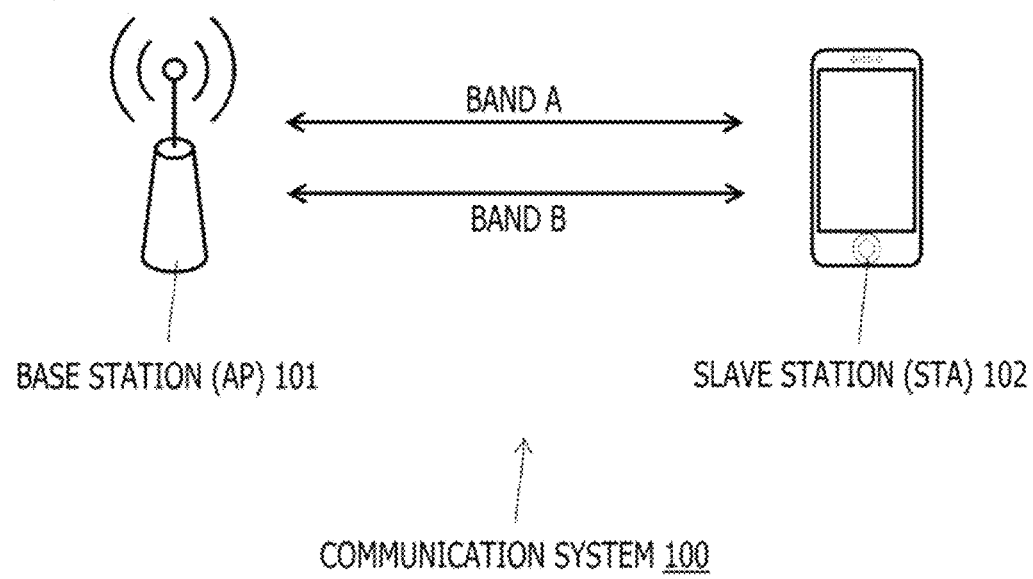
FIG. 1 is a view depicting an example of a schematic configuration of a communication system 100.

FIG. 1 depicts an example of a schematic configuration of a communication system 100 to which the technology proposed in the present specification is applied. The communication system 100 depicted in FIG. 1 includes one base station (AP) 101 and one slave station (STA) 102. Further, it is assumed that, in the communication system 100, two channels of a band A and a band B can be used. The bands A and B are, for example, a 5-GHz band and a 6-GHz band. The slave station 102 is connected to the base station 101, and a channel in the band A and a channel in the band B are bundled to perform communication.

It is to be noted that the number, the positional relation, and the frequencies of the communication apparatuses depicted in FIG. 1 are exemplary and are not limited to those described here. Further, communication may be performed by bundling multiple different channels in the bands A and B.

Figure 2:
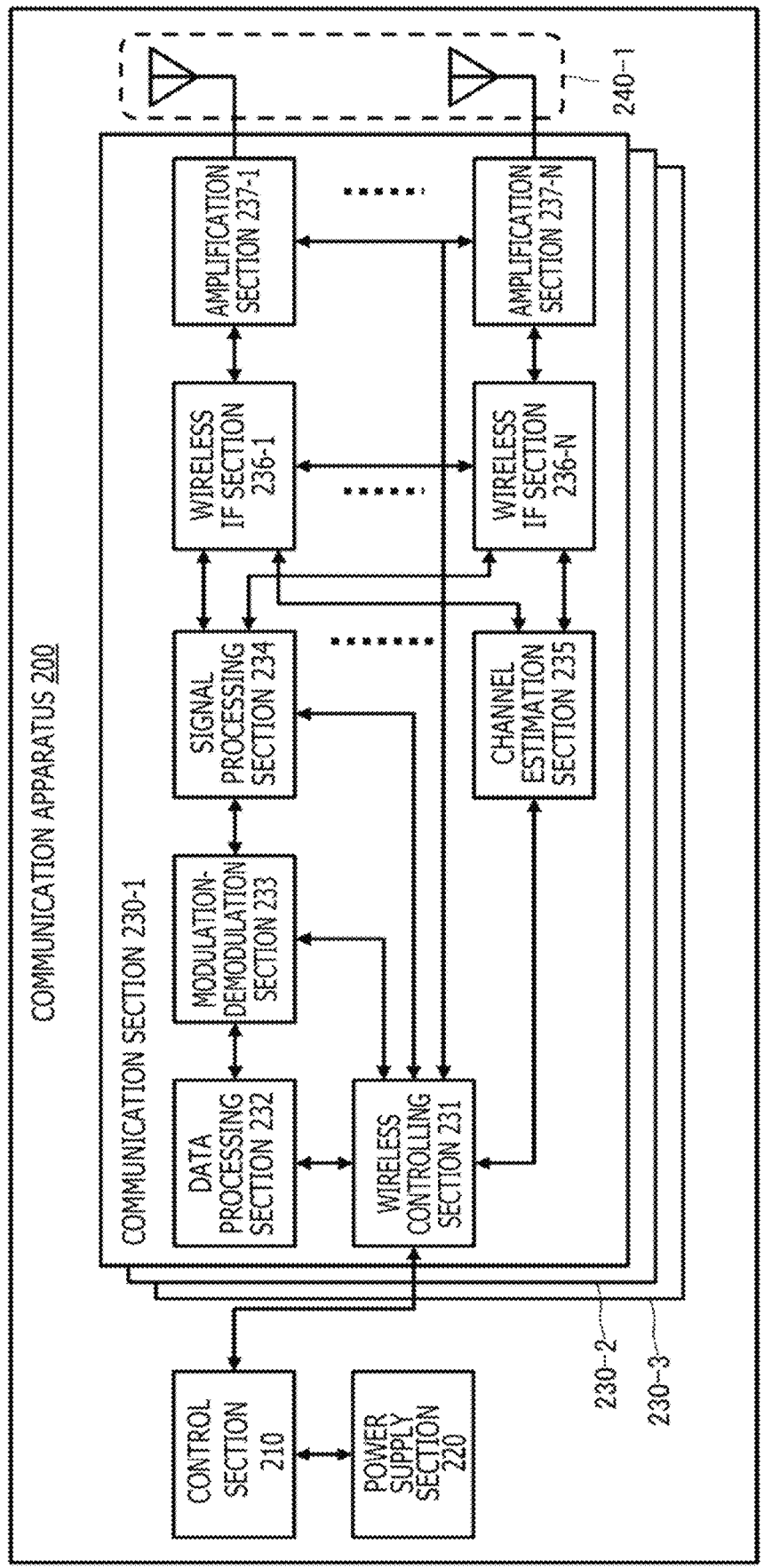
FIG. 2 is a view depicting an example of a functional configuration of a communication apparatus 200.

FIG. 2 depicts an example of a functional configuration of a communication apparatus 200 that can operate as either the base station or the slave station in the communication system 100 according to the present embodiment.

The communication apparatus 200 depicted in FIG. 2 includes a control section 210, a power supply section 220, multiple (in the example of FIG. 2, three) communication sections 230-1, 230-2, and 230-3, and antenna sections 240-1, . . . that are provided for the communication sections 230-1, . . . , respectively. It is to be noted that the communication sections 230-1 and the antenna sections 240-1 provided for the individual communication sections 230-1, . . . have the same configurations and are thus referred to as communication sections 230 and antenna sections 240, respectively, for simplifying the following description.

The communication section 230 has a processor such as a microprocessor and a circuit. The communication section 230 includes a wireless controlling section 231, a data processing section 232, a modulation-demodulation section 233, a signal processing section 234, a channel estimation section 235, multiple wireless interface (IF) sections 236-1, . . . , and 236-N arranged in parallel to one another, and amplification sections 237-1, . . . , and 237-N connected in series to the wireless interface sections 236-1, . . ., and 236-N (where N is an integer equal to two or more), respectively. Further, antenna elements included in the antenna section 240 corresponding to the communication section 230 are connected to the amplification sections 237-1, . . . , and 237-N.

The wireless interface section 236, the amplification section 237, and the antenna element in the antenna section 240 that are connected in series to one another are defined as one set, and one or more sets may be used as a component or components of the communication section 230. Further, the wireless interface sections 236-1, . . . , and 236-N may include functions of corresponding ones of the amplification sections 237-1, . . . , and 237-N.

Upon transmission when the data processing section 232 receives data as an input from an upper layer of an own communication protocol, the data processing section 232 generates a packet for wireless transmission from the received data, carries out processing such as processing of adding a header for media access control (MAC) or processing of adding an error detection code, and then supplies the processed data to the modulation-demodulation section 233. Further, upon reception when the data processing section 232 receives data as an input from the modulation-demodulation section 233, the data processing section 232 carries out analysis of a MAC header, detection of a packet error, a reorder process of packets, and so forth and supplies the processed data to the upper layer of the own protocol.

The wireless controlling section 231 controls transfer of information among the respective components in the communication apparatus 200. Further, the wireless controlling section 231 performs parameter setting in the modulation-demodulation section 233 and the signal processing section 234, scheduling of packets in the data processing section 232, and parameter setting and transmission power control of the wireless interface section 236 and the amplification section 237.

Upon the transmission, the modulation-demodulation section 233 performs encoding, interleave, and a modulation process on the data received from the data processing section 232, on the basis of an encoding scheme and a modulation scheme set by the wireless controlling section 231, to generate a data symbol stream, and then supplies the data symbol stream to the signal processing section 234. Further, upon the reception, the modulation-demodulation section 233 performs a demodulation process, deinterleave, and a decoding process, which are reverse processes with respect to those performed upon the transmission, on the input symbol stream from the signal processing section 234 and supplies the data to the data processing section 232 or the wireless controlling section 231.

Upon the transmission, the signal processing section 234 appropriately performs a signal process associated with spatial isolation, on the input from the modulation-demodulation section 233, and supplies one or more resulting transmission symbol streams to the respective wireless interface sections 236-1, . . . . Upon the reception, on the other hand, the signal processing section 234 performs a signal process on the symbol streams received as an input from the respective wireless interface sections 236-1, . . . , performs spatial isolation of the streams as needed, and then supplies the resulting streams to the modulation-demodulation section 233.

The channel estimation section 235 calculates complex channel gain information of a propagation path from a preamble part and a training signal part that are included in the input signals received from the respective wireless interface sections 236-1, . . . . The calculated complex channel gain information is used for the demodulation process in the modulation-demodulation section 233 and a space process in the signal processing section 234, through the wireless controlling section 231.

Upon the transmission, the wireless interface section 236 converts an input from the signal processing section 234 into an analog signal, performs filtering, up-conversion into a carrier frequency, and phase control on the analog signal, and then sends the resulting analog signal to the corresponding amplification section 237 or the corresponding antenna section 240. Further, upon the reception, the wireless interface section 236 performs processes such as down-conversion, filtering, and conversion into a digital signal, which are reverse processes with respect to those performed upon the transmission, on the input from the corresponding amplification section 237 or the corresponding antenna section 240, and supplies data to the signal processing section 234 and the channel estimation section 235.

Upon the transmission, the amplification section 237 amplifies the analog signal received as an input from the wireless interface section 236, to predetermined power, and sends the resulting analog signal to the corresponding antenna element in the antenna section 240. Further, upon the reception, the amplification section 237 performs low-noise amplification on a signal received as an input from the corresponding antenna element in the antenna section 240, to predetermined power, and outputs the resulting signal to the wireless interface section 236.

At least either the functions upon the transmission or the functions upon the reception of the amplification section 237 may be included in the wireless interface section 236. Further, at least either the functions upon the transmission or the functions upon the reception of the amplification section 237 may be included in a component other than the communication section 230.

A set of the wireless interface section 236 and the amplification section 237 forms one RF (Radio Frequency) branch. It is assumed that transmission and reception in one band can be performed by one RF branch. In the example of the apparatus configuration depicted in FIG. 2, the communication section 230 includes N RF branches.

The control section 210 includes a processor such as a microprocessor and a circuit and performs control of the wireless controlling section 231 and the power supply section 220. Further, in place of the wireless controlling section 231, the control section 210 may perform at least part of the abovementioned operation of the wireless controlling section 231. Specifically, in the present embodiment, the control section 210 and the wireless controlling section 231 control operation of the respective sections in order to implement operation according to examples to be described later.

The power supply section 220 includes a battery power supply or a fixed power supply and supplies power for driving, to the communication apparatus 200.

The communication section 230 may be configured such that, while the communication apparatus 200 is in a waiting state, the communication section 230 transits to a standby state or a sleep state (or to a state in which at least part of the functions is stopped) to implement low power consumption. In the example of the apparatus configuration depicted in FIG. 2, the communication section 230 includes N RF branches, and the communication section 230 may be configured such that transition to a standby state or a sleep state can be implemented for each RF branch. However, when data transmission and reception using carrier aggregation are carried out, it is necessary that at least RF branches equal in number to the number of bands to be aggregated return to a normal operation state.

It is to be noted that the control section 210 and the communication section 230 can be combined and configured as one or a plurality of LSIs (Large Scale Integration).

EXAMPLE 1

A first example is described in connection with an example in which, in the communication system 100 depicted in FIG. 1, the base station (AP) first transmits a frame for requesting transmission and then transmits a data frame.

Figure 3:
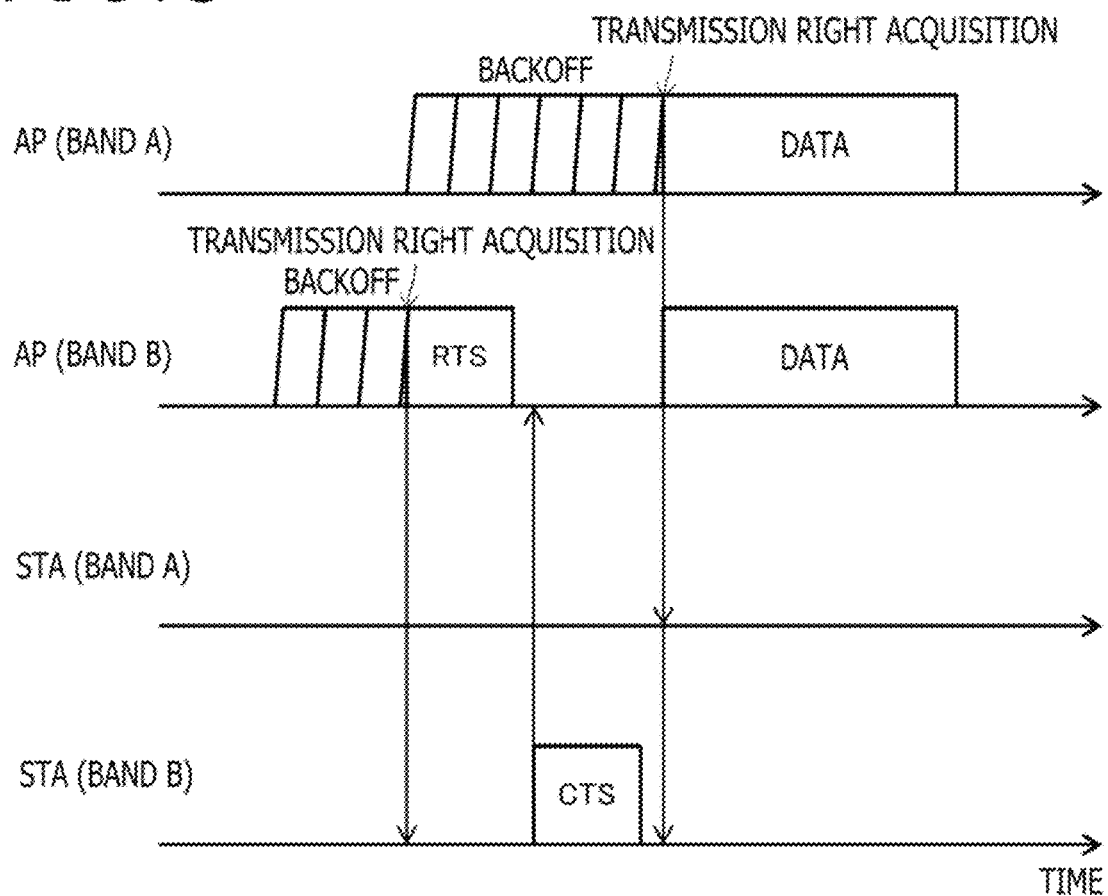
FIG. 3 is a view depicting an example of a communication sequence in a case where a base station and a slave station communicate with each other by using two channels of a band A and a band B (first example).

FIG. 3 depicts an example of a communication sequence in a case where the base station (AP) and the slave station (STA) communicate with each other by using two channels of the band A and the band B. It is assumed that the STA is connected to the AP. Further, the AP and the STA may check with each other in advance whether they are able to perform operation according to the present example. Further, the AP and the STA can acquire the transmission right according to a channel access method, for example, by CSMA/CA (Carrier Sence Multiple Access with Collision Avoidance).

First, the AP acquires the transmission right in the band B. It is assumed that the AP transmits data by bundling the band A and the band B, but backoff is not completed in the band A. Therefore, the AP uses the band B to transmit an RTS frame for requesting transmission, in order to maintain the transmission right in the band B (or in order to prevent another communication terminal from acquiring the transmission right) until the AP acquires the transmission right in the band A.

After the STA receives the RTS frame from the AP in the band B, the STA similarly uses the band B to return a CTS frame for permitting transmission. Consequently, when another communication terminal (not depicted) using the band B receives at least either the RTS frame or the CTS frame, the other communication terminal waits to transmit data in the band B to set an NAV (Network Allocation Vector).

The RTS frame and the CTS frame include information regarding transmission right acquisition in another band (which will be described later). Specifically, the information regarding transmission right acquisition in another band is, for example, information indicative of whether or not transmission right acquisition in the other band is being waiting or information of a band in which the transmission right is not acquired yet. In particular, information indicating that the AP is in a state of waiting for transmission right acquisition in the band A is described in the RTS frame and the CTS frame.

Accordingly, the STA can recognize, from the received RTS frame, that the AP is to transmit data to the STA by bundling the band A and the band B. For example, when the RF branch for the band A of the STA is in a standby state or a sleep state, the STA makes the RF branch for the band A return to an ordinary operation state to prepare for transmission of data from the AP in the band A and the band B that are bundled.

If another communication terminal sets an NAV, the AP can maintain the transmission right in the band B. Thereafter, if the AP acquires the transmission right also in the band A, the AP starts transmission of data to the STA by bundling the band A and the band B. Then, on the STA side, the data transmitted by bundling the band A and the band B can be received.

Figure 4:
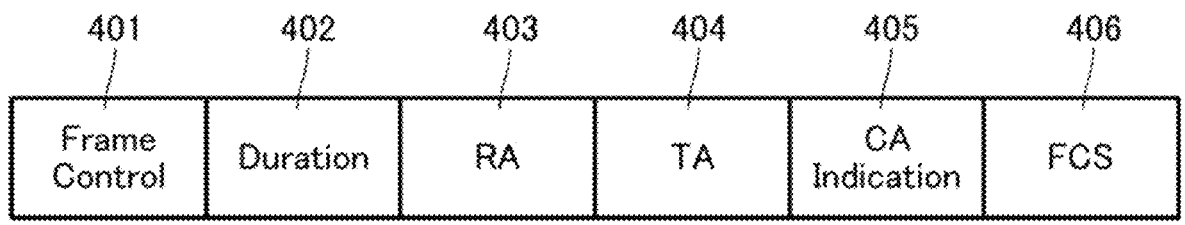
FIG. 4 is a view depicting an example of a format of an RTS frame.
Figure 5:
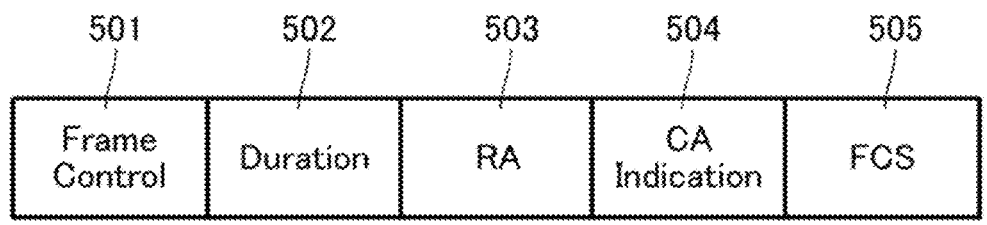
FIG. 5 is a view depicting an example of a format of a CTS frame.

FIG. 4 depicts an example of the format of the RTS frame used in the communication sequence depicted in FIG. 3. Further, FIG. 5 depicts an example of the format of the CTS frame used in the communication sequence depicted in FIG. 3.

In Frame Control fields denoted by reference signs 401 and 501, information regarding the respective types of the RTS frame and the CTS frame is described.

In Duration fields denoted by reference signs 402 and 502, information regarding time required to complete succeeding data communication is described. A neighboring terminal that does not perform communication reads the value of the field and sets an NAV. In a case where the time required for the AP to acquire the transmission right in the band A is known, a period from transmission of data until reception of an ACK frame corresponding to the data is described in the Duration field. On the other hand, in a case where the time required for the AP to acquire the transmission right in the band A is not known, an allowable maximum value is described in the Duration field.

RA (Receiver Address) denoted by reference signs 403 and 503 is a field including the MAC address of a transmission designation of each frame. Further, TA (Transmitter Address) denoted by a reference sign 404 is a field including the MAC address of a transmission source of each frame.

In CA (Carrier Aggregation) Indications fields denoted by reference signs 405 and 504, information regarding transmission right acquisition in another band is described. In particular, in the CA indication field, information indicating a state in which transmission right acquisition in another band is being waiting or information indicating that there remains a band in which the transmission right is not acquired yet is described.

FCS (Frame Check Sequence) denoted by reference signs 406 and 505 is a field indicative of an error correction code of the entire frame.

For example, in a case where the band A becomes busy in the middle of exchange of RTS/TTS frames in the band B or after such frame exchange is completed, the AP or the STA may suspend the securing of the transmission right in the band B.

Figure 6:
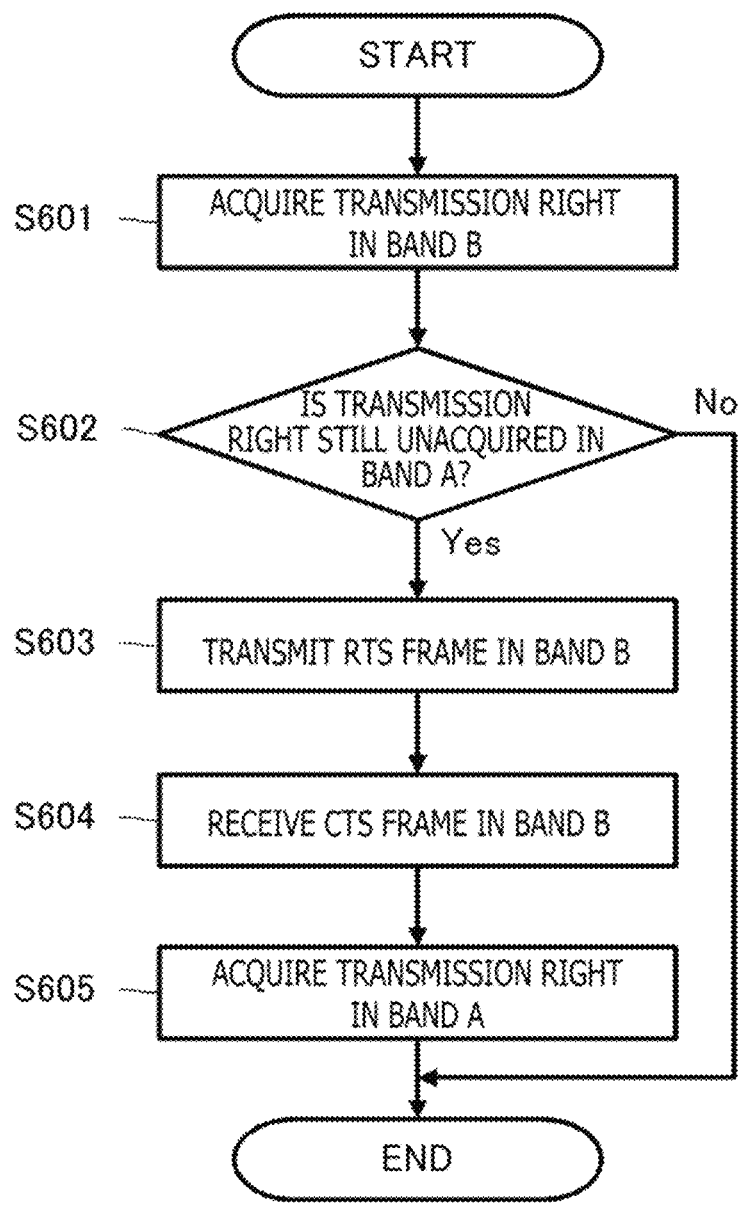
FIG. 6 is a flow chart illustrating a processing procedure that is executed by an AP (first example).

FIG. 6 depicts, in the form of a flow chart, a processing procedure executed by the AP in the first example. The processing procedure is executed when the communication apparatus 200 depicted in FIG. 2 functions as the AP in the communication system 100 in which two channels of the band A and the band B can be used.

After the AP acquires the transmission right in the band B (step S601), the AP checks whether or not the transmission right is still unacquired in the band A (step S602).

Here, in a case where the AP has already acquired the transmission right also in the band A (No in step S602), the AP can transmit data by bundling the band A and the band B, and the present processing thus ends.

On the other hand, in a case where the AP has not acquired the transmission right in the band A yet (Yes in step S602), the AP transmits an RTS frame in the band B (step S603), receives a CTS frame in the band B (step S604), and maintains the transmission right in the band B until the AP acquires the transmission right in the band A.

Then, after the AP acquires the transmission right also in the band A (step S605), the AP can transmit data by bundling the band A and the band B, and the present processing thus ends.

It is to be noted that, although not depicted in the flow chart, in a case where the band A becomes busy in the middle of exchange of the RTS/CTS frames in the band B or after such frame exchange is completed, the AP may suspend the securing of the transmission right in the band B.

According to the processing procedure depicted in FIG. 6, since an NAV is set not only to a neighboring terminal around the AP but also to a neighboring terminal around the STA, it is possible to cause a terminal (hidden terminal) which is positioned outside a range within which a signal is transmitted from the transmission side (AP), to wait for transmission therefrom.

EXAMPLE 2

In the description of a second example, an example is described in which, in the communication system 100 depicted in FIG. 1, the base station (AP) transmits a CTS frame in a band in which the transmission right is acquired, to thereby maintain the transmission right.

Figure 7:
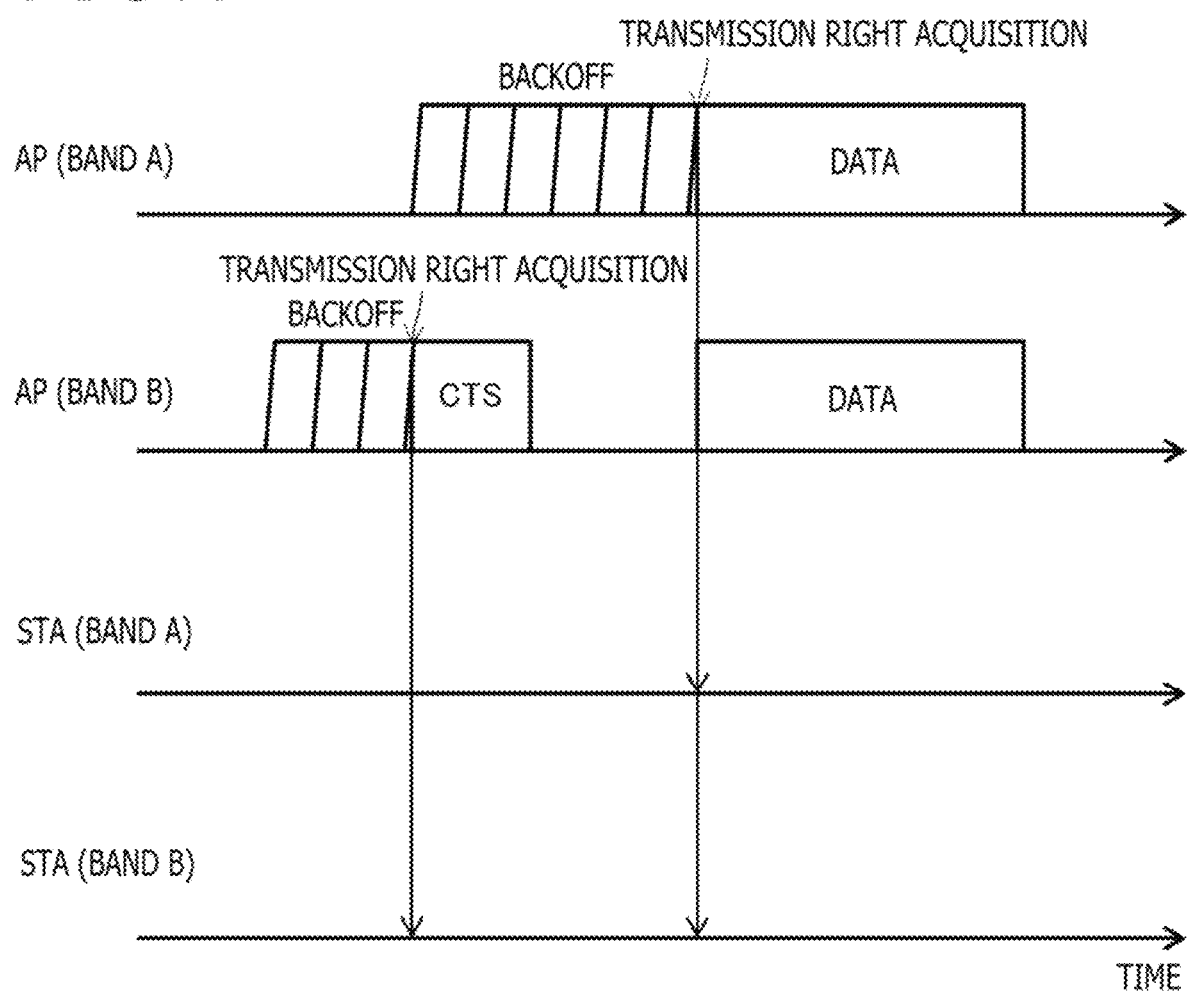
FIG. 7 is a view depicting an example of a communication sequence in a case where the base station and the slave station communicate with each other by using the two channels of the band A and the band B (second example).

FIG. 7 depicts an example of a communication sequence in a case where the base station (AP) transmits a CTS frame to the slave station (STA). It is assumed that the STA is connected to the AP. Further, the AP and the STA may check with each other in advance whether they are able to perform operation according to the present example. Further, the AP and the STA can acquire the transmission right according to a channel access method, for example, by CSMA/CA.

First, the AP acquires the transmission right in the band B. It is assumed that the AP transmits data by bundling the band A and the band B, but backoff is not completed in the band A. Therefore, the AP transmits a CTS frame in the band B in order to maintain the transmission right in the band B (or in order to prevent another communication terminal from acquiring the transmission right) until the AP acquires the transmission right in the band A.

Here, the CTS frame transmitted from the AP has such a frame format as depicted in FIG. 5, and RA is the MAC address of the AP that is the transmission source, such as CTS-to-Self. It is to be noted that CTS-to-self is a function prescribed by IEEE 802.11g, and the AP intentionally transmits a CTS to the AP itself to notify the STA connected to the AP that communication is to be performed.

Consequently, another terminal using the band B sets an NAV according to the content described in Duration in the transmitted CTS frame and waits for transmission in the band B.

The CTS frame transmitted from the AP includes information regarding transmission right acquisition in another band (described above). In particular, information indicating that the AP is in a state of waiting for transmission right acquisition in the band A is described in the CTS frame. Accordingly, the STA can recognize, from the received CTS frame, that the AP is to transmit data to the STA by bundling the band A and the band B. For example, when the RF branch for the band A of the STA is in a standby state or a sleep state, the STA makes the RF branch for the band A return to an ordinary operation state to prepare for transmission of data from the AP in the band A and the band B that are bundled.

If another communication terminal sets an NAV, the AP can maintain the transmission right in the band B. After the AP acquires the transmission right also in the band A, the AP starts transmission of data to the STA by bundling the band A and the band B. Then, on the STA side, the data transmitted by bundling the band A and the band B can be received.

It is to be noted that, in a case where the band A becomes busy during transmission of the CTS frame in the band B or after completion of the transmission of the CTS frame, the AP and the STA may suspend the securing of the transmission right in the band B.

Figure 8:
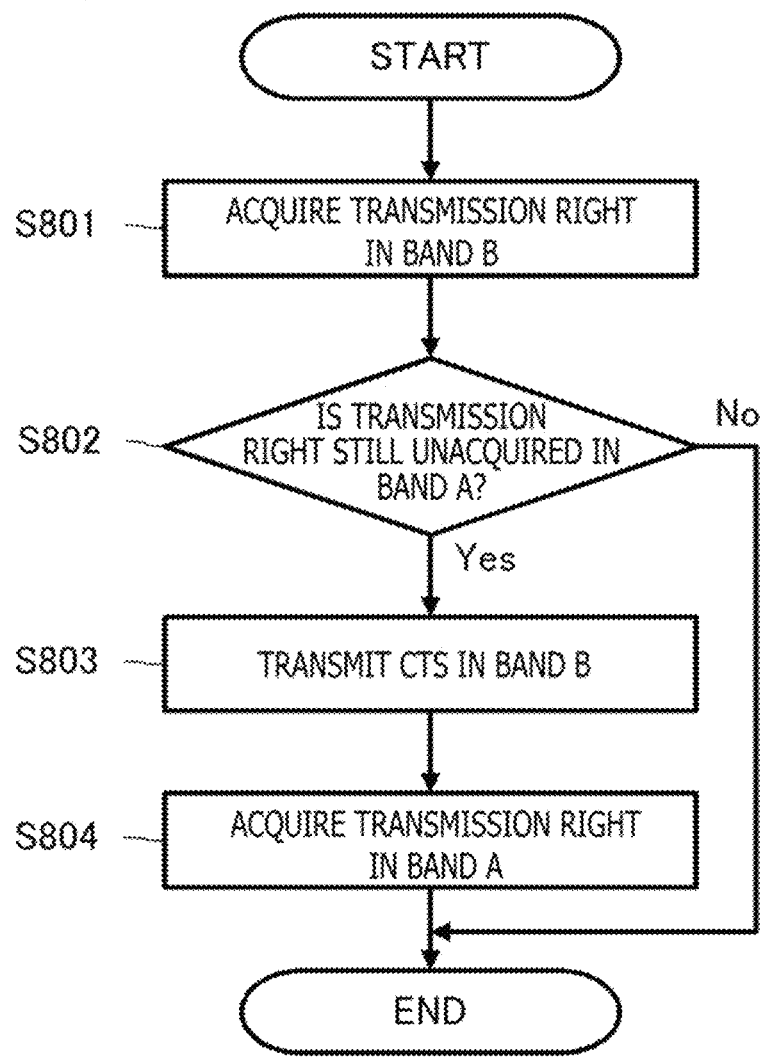
FIG. 8 is a flow chart illustrating a processing procedure that is executed by the AP (second example).

FIG. 8 depicts, in the form of a flow chart, a processing procedure executed by the AP in the second example. The processing procedure is executed when the communication apparatus 200 depicted in FIG. 2 functions as the AP in the communication system 100 in which two channels of the band A and the band B can be used.

After the AP acquires the transmission right in the band B (step S801), the AP checks whether or not the transmission right is still unacquired in the band A (step S802).

Here, in a case where the AP has already acquired the transmission right also in the band A (No in step S802), the AP can transmit data by bundling the band A and the band B, and the present processing thus ends.

On the other hand, in a case where the AP has not acquired the transmission right in the band A yet (Yes in step S802), the AP transmits a CTS frame in the band B (step S803) and maintains the transmission right in the band B until the AP acquires the transmission right in the band A.

Then, after the AP acquires the transmission right also in the band A (step S804), the AP can transmit data by bundling the band A and the band B, and the present processing thus ends.

It is to be noted that, although not depicted in the flow chart, in a case where the band A becomes busy in the middle of transmission of the CTS frame in the band B or after such transmission of the CTS frame is completed, the AP may suspend the securing of the transmission right in the band B.

According to the processing procedure depicted in FIG. 8, it is possible to cause a terminal around the AP to wait for transmission therefrom, and the transmission right can be maintained until data is transmitted by using multiple bands.

EXAMPLE 3

In the description of a third example, an example is described in which, in the communication system 100 depicted in FIG. 1, the base station (AP) maintains the transmission right in a band in which the transmission right has been acquired, by transmitting not an RTS frame or a CTS frame but a data frame.

Figure 9:
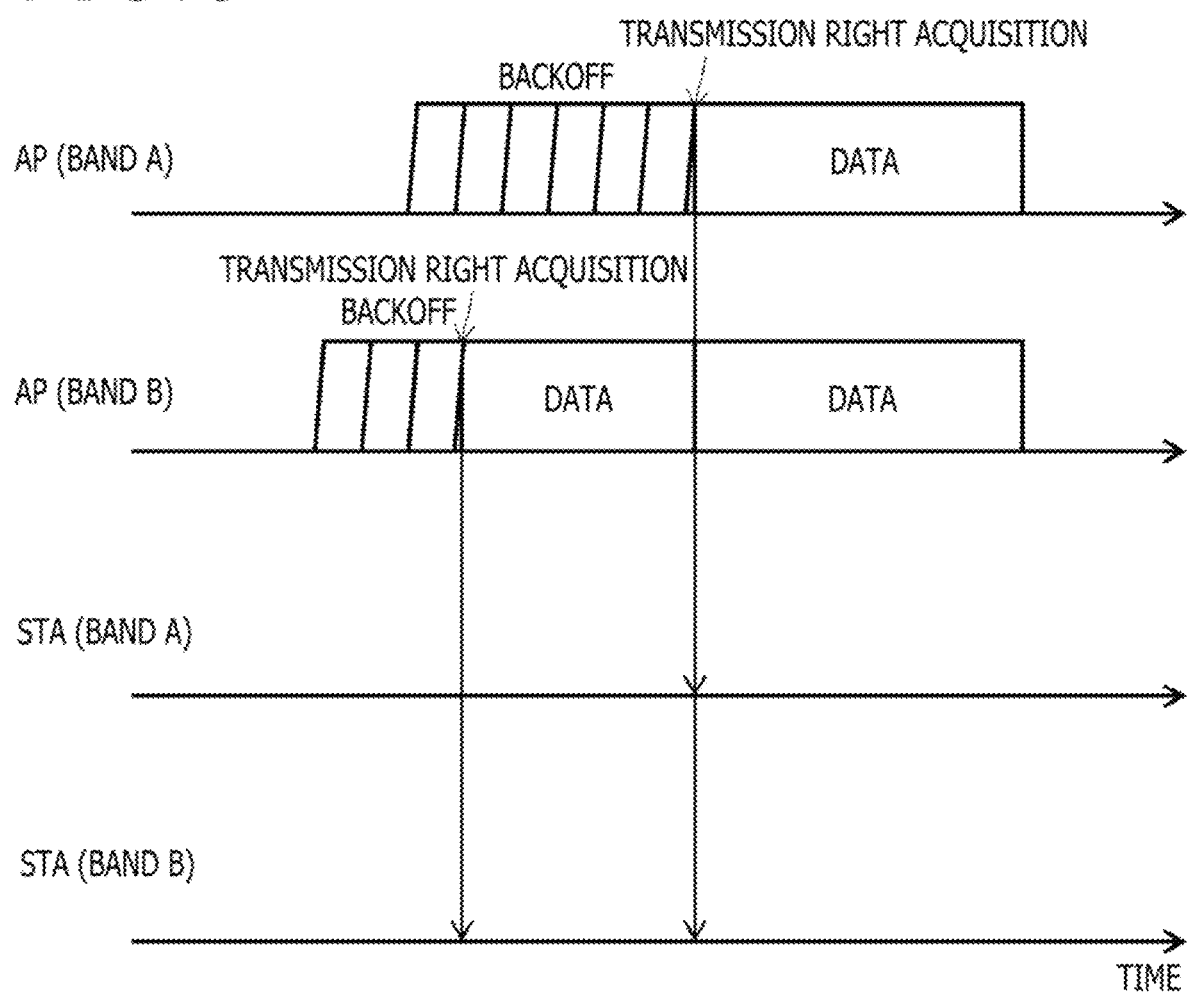
FIG. 9 is a view depicting an example of a communication sequence in a case where the base station and the slave station communicate with each other by using the two channels of the band A and the band B (third example).

FIG. 9 depicts an example of a communication sequence in a case where the base station (AP) transmits a data frame to the slave station (STA). It is assumed that the STA is connected to the AP. Further, the AP and the STA may check with each other in advance whether they are able to perform operation according to the present example. Further, the AP and the STA can acquire the transmission right according to a channel access method, for example, by CSMA/CA.

First, the AP acquires the transmission right in the band B. It is assumed that the AP transmits data by bundling the band A and the band B, but backoff is not completed in the band A. Therefore, the AP transmits a data frame to the STA in the band B. As a result, until the AP acquires the transmission right in the band A, the AP maintains the transmission right in the band B (or prevents another communication terminal from acquiring the transmission right). The transmission period of a data frame may be determined on the basis of the period from transmission right acquisition in the band B until transmission right acquisition in the band A.

Another terminal using the band B sets an NAV according to the content described in Duration in the data frame transmitted from the AP and waits for transmission in the band B. Since the other communication terminal sets the NAV, the AP can maintain the transmission right in the band B.

The data frame transmitted from the AP includes information regarding transmission right acquisition in another band (described above). In particular, information indicating that the AP is in a state of waiting for transmission right acquisition in the band A is described in the data frame. Accordingly, the STA can recognize, from the received data frame, that the AP is to perform transmission of data to the STA by bundling the band A and the band B. For example, when the RF branch for the band A of the STA is in a standby state or a sleep state, the STA makes the RF branch for the band A return to an ordinary operation state to prepare for transmission of data from the AP in the band A and the band B that are bundled.

After the AP acquires the transmission right also in the band A, the AP suspends the transmission of data in the band B and bundles the band A and the band B to start transmission of data to the STA. Then, on the STA side, the data transmitted by bundling the band A and the band B can be received.

The AP may suspend the data transmission in the band B immediately after the AP acquires the transmission right in the band A. Alternatively, after the AP acquires the transmission right in the band A, the AP may continue data transmission only in the band B until a certain period of time during which the STA can decode the data in the middle of processing elapses, and then end the data transmission in the band B to switch to data transmission using carrier aggregation by bundling the band A and the band B. Here, the certain period of time is, for example, an end of an A-MPDU (Aggregate MAC Protocol Data Unit) sub frame of the A-MPDU or a block unit of the LDPC (Low Density Parity Check) code.

It is to be noted that, in a case where the band A becomes busy during transmission of a data frame in the band B or after completion of transmission of the data frame, the AP and the STA may suspend the securing of the transmission right in the band B.

Figure 10:
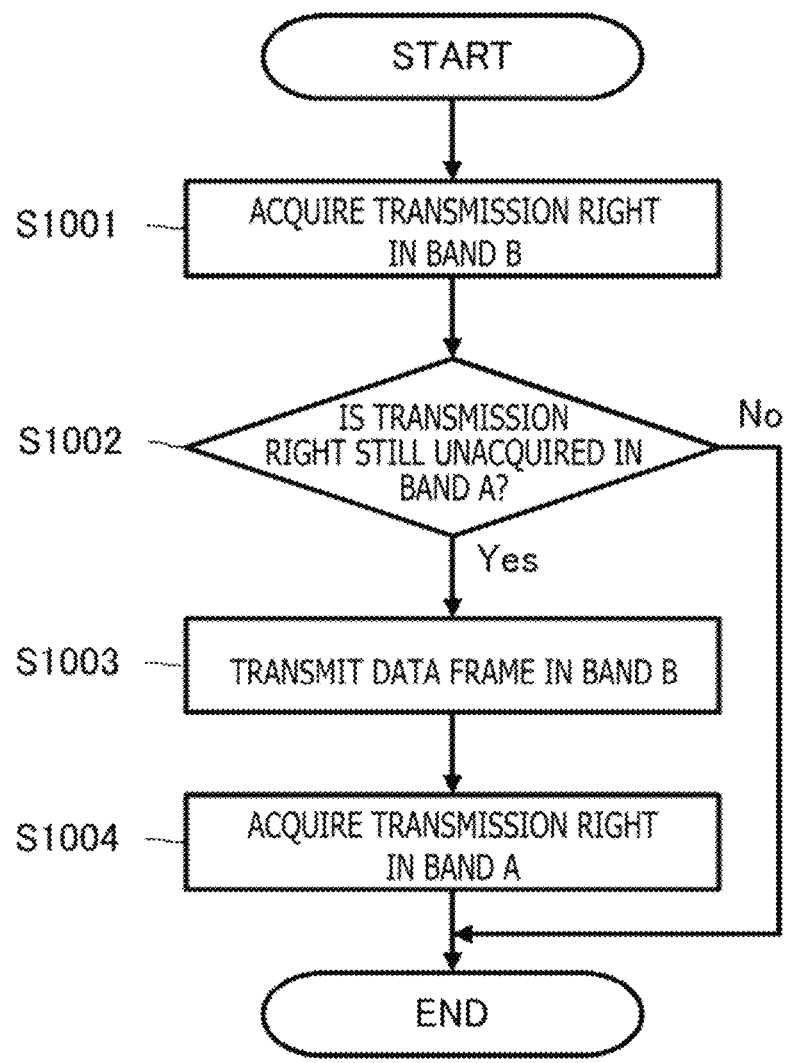
FIG. 10 is a flow chart illustrating a processing procedure that is executed by the AP (third example).

FIG. 10 depicts, in the form of a flow chart, a processing procedure executed by the AP in the third example. The processing procedure is executed when the communication apparatus 200 depicted in FIG. 2 functions as the AP in the communication system 100 in which two channels of the band A and the band B can be used.

After the AP acquires the transmission right in the band B (step S1001), the AP checks whether or not the transmission right is still unacquired in the band A (step S1002).

Here, in a case where the AP has already acquired the transmission right also in the band A (No in step S1002), the AP can transmit data by bundling the band A and the band B, and the present processing thus ends.

On the other hand, in a case where the AP has not acquired the transmission right in the band A yet (Yes in step S1002), the AP transmits a data frame in the band B (step S1003) and maintains the transmission right in the band B until the AP acquires the transmission right in the band A.

When the AP acquires the transmission right also in the band A (step S1004), the present processing then ends.

After the AP acquires the transmission right also in the band A, the AP suspends the transmission of data in the band B and starts transmission of data to the STA by carrier aggregation in which the band A and the band B are bundled.

It is to be noted that, although not depicted in the flow chart, in a case where the band A becomes busy in the middle of transmission of data frame in the band B or after such transmission of the data frame is completed, the AP may suspend the securing of the transmission right in the band B.

According to the processing procedure depicted in FIG. 10, it is possible for the AP to efficiently use the time required to acquire the transmission right in all bands to be used in carrier aggregation, to perform data transmission.

EXAMPLE 4

In the description of a fourth example, an example is described in which, in the communication system 100 depicted in FIG. 1, the base station (AP) maintains the transmission right by transmitting a busy tone in a band in which the transmission right has been acquired.

Figure 11:
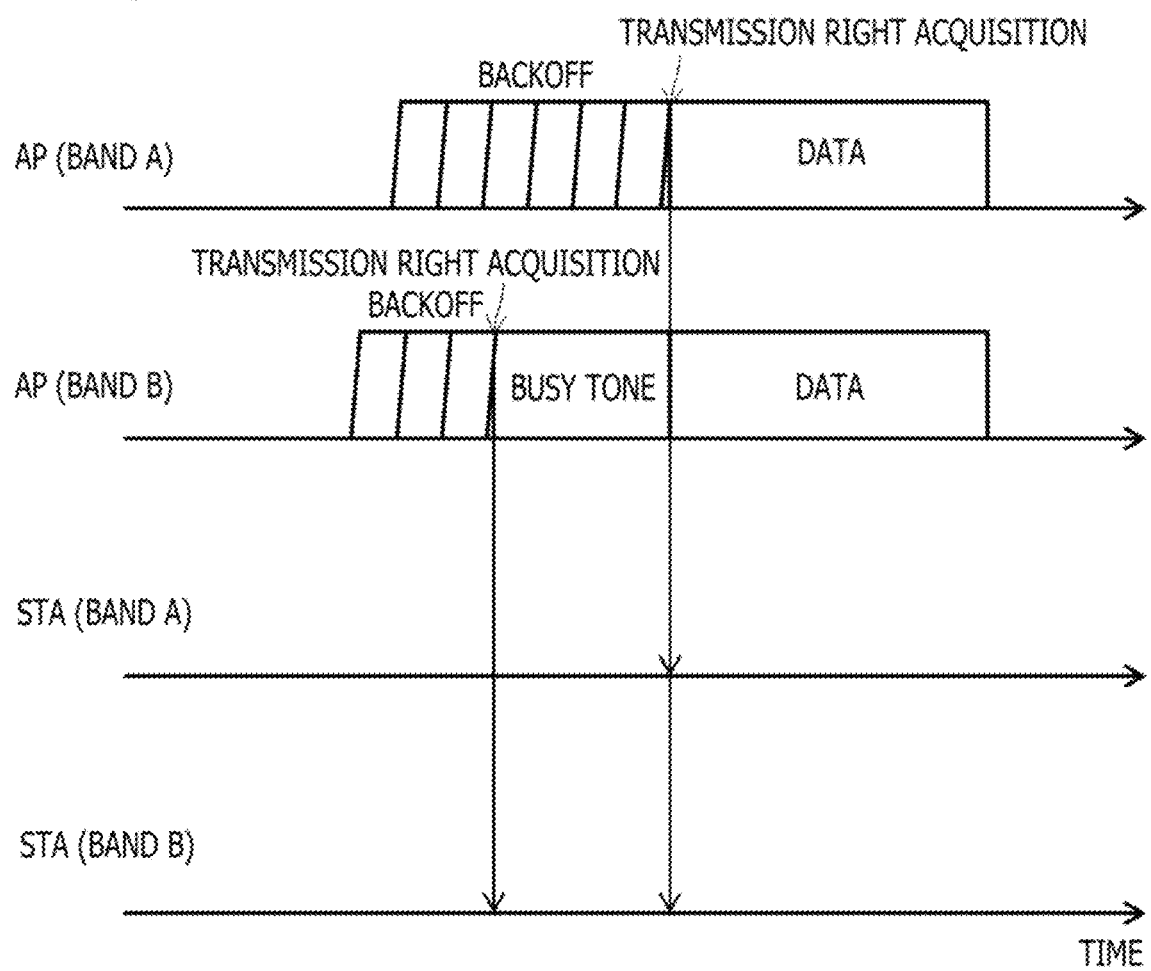
FIG. 11 is a view depicting an example of a communication sequence in a case where the base station and the slave station communicate with each other by using the two channels of the band A and the band B (fourth example).

FIG. 11 depicts an example of a communication sequence in a case where the base station (AP) transmits a busy tone to the slave station (STA). It is assumed that the STA is connected to the AP. Further, the AP and the STA may check with each other in advance whether they are able to perform operation according to the present example. Further, the AP and the STA can acquire the transmission right according to a channel access method, for example, by CSMA/CA.

First, the AP acquires the transmission right in the band B. It is assumed that the AP transmits data by bundling the band A and the band B, but backoff is not completed in the band A. Therefore, the AP transmits a busy tone in the band B. As a result, until the AP acquires the transmission right in the band A, the AP maintains the transmission right in the band B (or prevents another communication terminal from acquiring the transmission right). The transmission period of a busy tone may be determined on the basis of a period from transmission right acquisition in the band B until transmission right acquisition in the band A.

If another terminal using the band B detects the busy tone transmitted from the AP during the backoff period, the other terminal waits for transmission in the band B. By preventing the other communication terminal from acquiring the transmission right in such a manner, the AP can maintain the transmission right in the band B.

Further, the busy tone transmitted from the AP includes information regarding transmission right acquisition in another band (described above). In particular, information indicating that the AP is in a state of waiting for transmission right acquisition in the band A is described in the busy tone (for example, in a preamble signal). Accordingly, the STA can recognize, from the received busy tone, that the AP is to perform transmission of data to the STA by bundling the band A and the band B. For example, when the RF branch for the band A of the STA is in a standby state or a sleep state, the STA makes the RF branch for the band A return to an ordinary operation state to prepare for transmission of data from the AP in the band A and the band B that are bundled.

After the AP acquires the transmission right also in the band A, the AP suspends the transmission of data in the band B and starts transmission of data to the STA by carrier aggregation in which the band A and the band B are bundled. Then, on the STA side, the data transmitted by bundling the band A and the band B can be received.

In the present example, any format of the busy tone can be used. The busy tone may include information regarding the time at which the AP is to transmit a data signal, in order to allow a communication terminal that conforms to the IEEE 802.11 standard, to set an NAV. Further, the busy tone may include network identification information such as BSS (Basic Service Set) identification information in order to allow a communication terminal that conforms to the IEEE 802.11 standard, to determine whether to stop receiving a signal. On the busy tone, a signal pattern common to that of another system (for example, a cellular system) may be superimposed. This also makes it possible to prevent interruption from the other system.

It is to be noted that, in a case where the band A becomes busy during transmission of a busy tone in the band B or after completion of such transmission of the busy tone, the AP and the STA may suspend the securing of the transmission right in the band B.

Figure 12:
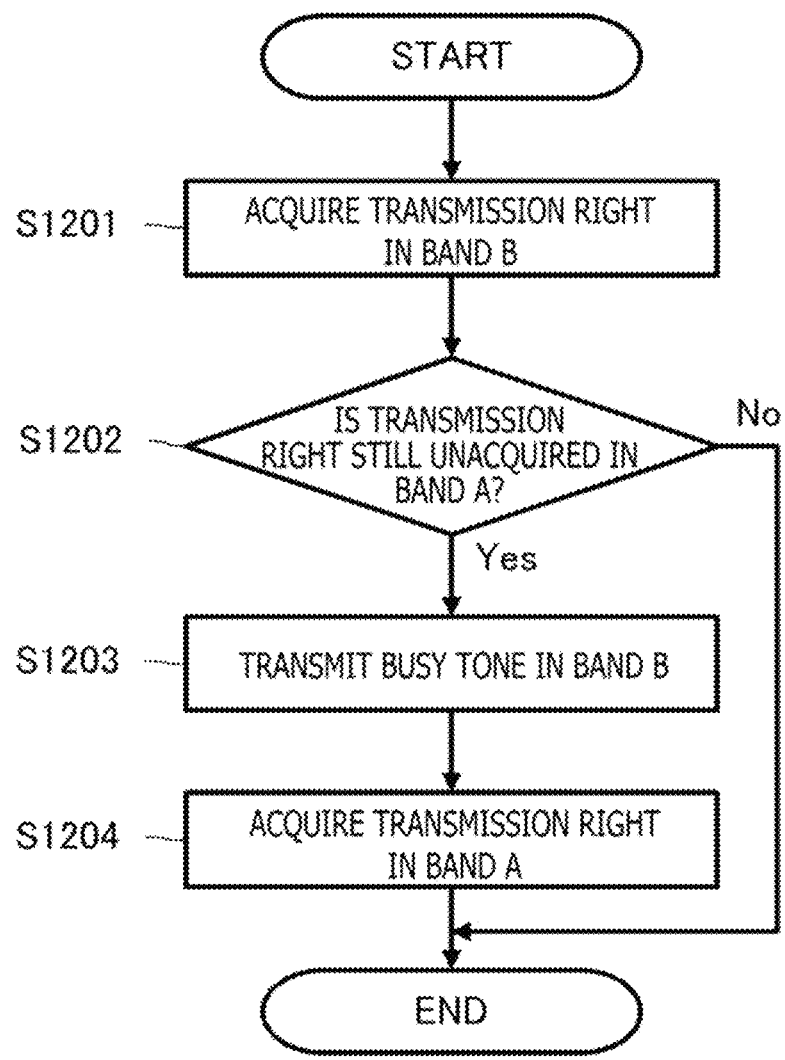
FIG. 12 is a flow chart illustrating a processing procedure that is executed by the AP (fourth example).

FIG. 12 depicts, in the form of a flow chart, a processing procedure executed by the AP in the fourth example. The processing procedure is executed when the communication apparatus 200 depicted in FIG. 2 functions as the AP in the communication system 100 in which two channels of the band A and the band B can be used.

After the AP acquires the transmission right in the band B (step S1201), the AP checks whether or not the transmission right is still unacquired in the band A (step S1202).

Here, in a case where the AP has already acquired the transmission right also in the band A (No in step S1202), the AP can transmit data by bundling the band A and the band B, and the present processing thus ends.

On the other hand, in a case where the AP has not acquired the transmission right in the band A yet (Yes in step S1202), the AP transmits a busy tone in the band B (step S1203) and prevents another terminal from acquiring the transmission right in the band B until the AP acquires the transmission right in the band A, to maintain the transmission right in the band B.

When the AP acquires the transmission right also in the band A (step S1204), the present processing then ends.

After the AP acquires the transmission right also in the band A, the AP suspends the transmission of the busy tone in the band B and starts transmission of data to the STA by carrier aggregation in which the band A and the band B are bundled.

It is to be noted that, although not depicted in the flow chart, in a case where the band A becomes busy in the middle of transmission of the busy tone in the band B or after such transmission of the busy tone is completed, the AP may suspend the securing of the transmission right in the band B.

According to the processing procedure depicted in FIG. 12, it is possible to prevent interruption of other communication even in a case where the period of time until the transmission right is acquired in all bands to be used in carrier aggregation is short. Further, transmission performed by a terminal of another wireless communication system that cannot decode a frame that conforms to the IEEE 802.11 standard can be caused to wait in response to power detection of the busy tone.

EXAMPLE 5

In the description of a fifth example, an example is described in which, in the communication system 100 depicted in FIG. 1, the base station (AP) changes a signal to be transmitted, according to a period of time from transmission right acquisition in a certain band until transmission right acquisition in another band, to maintain the transmission right which is acquired first in the band.

Figure 13:
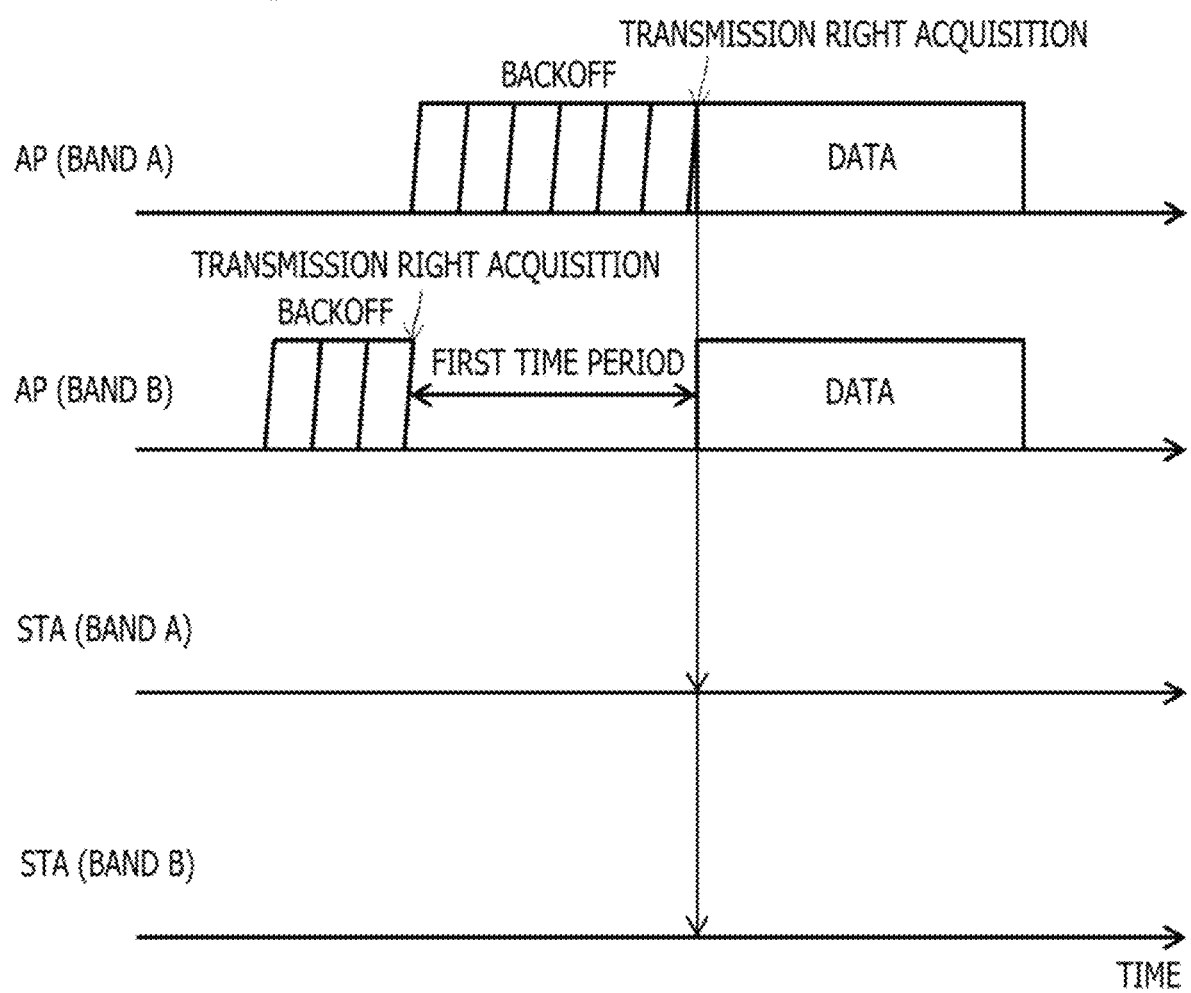
FIG. 13 is a view depicting an example of a communication sequence in a case where the base station and the slave station communicate with each other by using the two channels of the band A and the band B (fifth example).

FIG. 13 depicts an example of a communication sequence in a case where the base station (AP) transmits a signal based on a period of time to the slave station (STA). It is assumed that the STA is connected to the AP. Further, the AP and the STA may check with each other in advance whether they are able to perform operation according to the present example. Further, the AP and the STA can acquire the transmission right according to a channel access method, for example, by CSMA/CA.

First, the AP acquires the transmission right in the band B. It is assumed that the AP transmits data by bundling the band A and the band B, but backoff is not completed in the band A. Therefore, the AP transmits a frame to the STA in the band B. As a result, until the AP acquires the transmission right in the band A, the AP maintains the transmission right in the band B (or prevents another communication terminal from acquiring the transmission right).

Here, the AP changes the frame to be transmitted, according to a first time period required for the AP to acquire the transmission right in the band A.

In a case where the first time period is equal to or longer than the time required to transmit a minimum unit of data that can be decoded by the STA, such as at least one sub frame of the A-MPDU, (in other words, a minimum transmission time period of a data frame), the AP transmits a data frame in the band B and carries out operation similar to that in the case of the third example.

Further, in a case where the first time period is equal to or longer than the time required to exchange RTS/CTS frames between the AP and the STA, the AP transmits an RTS frame in the band B and carries out operation similar to that in the case of the first example.

Further, in a case where the first time period is shorter than the time required to exchange RTS/CTS frames between the AP and the STA but is equal to or longer than the time required to transmit a CTS frame, the AP transmits the CTS frame in the band B and carries out operation similar to that in the case of the second example.

Further, in a case where the first time period is shorter than the time required to transmit a CTS frame, the AP transmits a busy tone in the band B and carries out operation similar to that in the case of the fourth example.

In such a manner, by transmitting a signal based on the length of the first time period in the band B, the AP maintains the transmission right in the band B (or prevents another communication terminal from acquiring the transmission right) until the AP acquires the transmission right in the band A.

In a case where the AP transmits any one of a data frame, an RTS frame, and a CTS frame, another terminal using the band B sets an NAV according to the content described in Duration in the frame transmitted from the AP and waits for transmission in the band B. Since the other communication terminal sets the NAV, the AP can maintain the transmission right in the band B.

Further, in a case where the AP transmits a busy tone, if another terminal using the band B detects the busy tone transmitted from the AP during a backoff period, the other terminal waits for transmission in the band B. By preventing the other communication terminal from acquiring the transmission right in such a manner, the AP can maintain the transmission right in the band B.

After the AP acquires the transmission right also in the band A, the AP suspends the transmission of the busy tone in the band B and starts transmission of data to the STA by carrier aggregation in which the band A and the band B are bundled.

Figure 14:
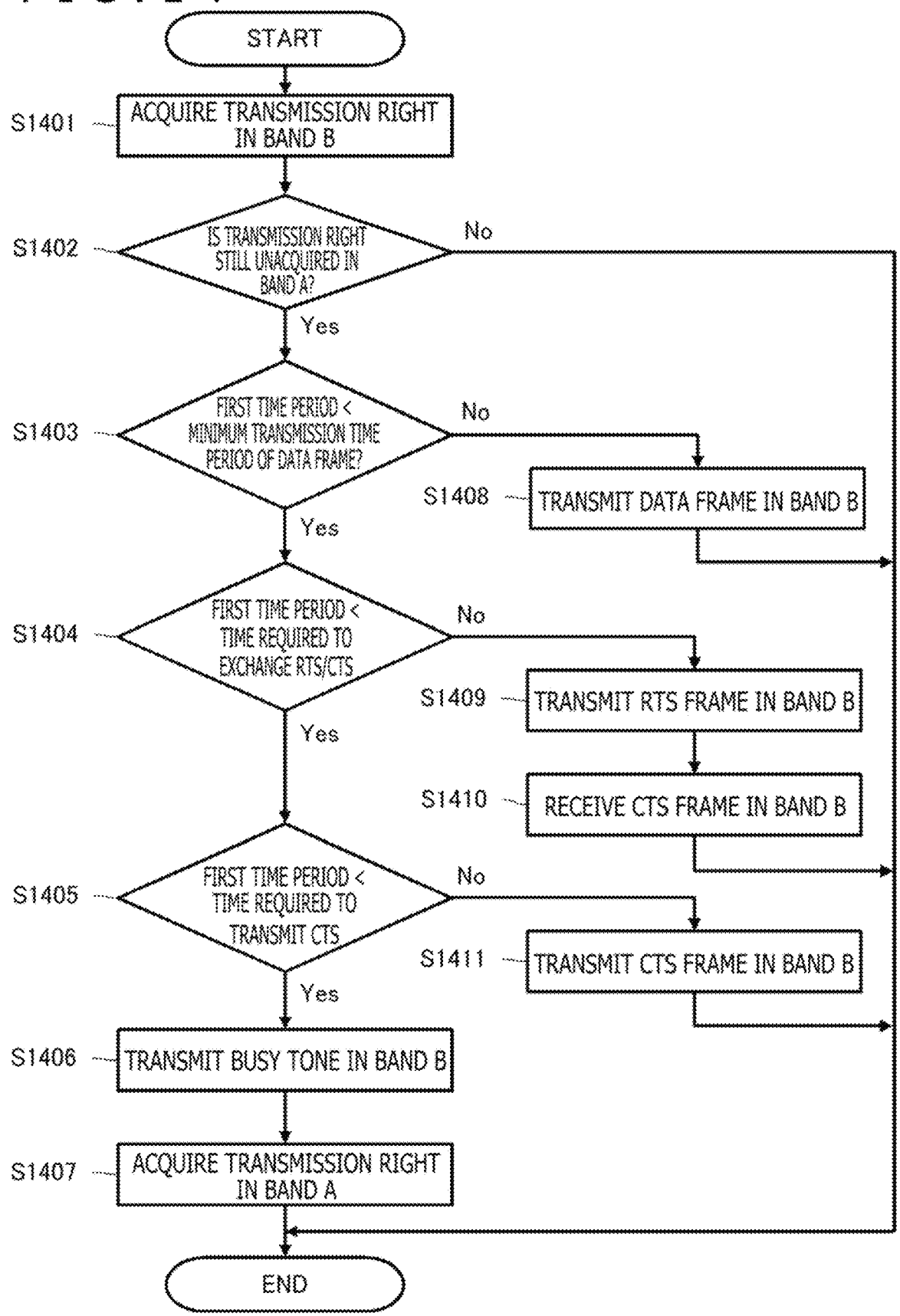
FIG. 14 is a flow chart illustrating a processing procedure that is executed by the AP (fifth example).

FIG. 14 depicts, in the form of a flow chart, a processing procedure executed by the AP in the fifth example. The processing procedure is executed when the communication apparatus 200 depicted in FIG. 2 functions as the AP in the communication system 100 in which two channels of the band A and the band B can be used.

After the AP acquires the transmission right in the band B (step S1401), the AP checks whether or not the transmission right is still unacquired in the band A (step S1402).

Here, in a case where the AP has already acquired the transmission right also in the band A (No in step S1402), the AP can transmit data by bundling the band A and the band B, and the present processing thus ends.

On the other hand, in a case where the AP has not acquired the transmission right in the band A yet (Yes in step S1402), the AP checks the length of the first time period required to acquire the transmission right in the band A.

In a case where the first time period is equal to or longer than the time required to transmit a minimum unit of data that can be decoded by the STA, such as at least one sub frame of the A-MPDU, (in other words, a minimum transmission time period of a data frame) (No in step S1403), the AP transmits a data frame in the band B similarly to the case of the third example (step S1408).

Further, in a case where the first time period is shorter than the minimum transmission time period of a data frame (Yes in step S1403) but is equal to or longer than the time required to exchange RTS/CTS frames between the AP and the STA (Yes in step S1404), the AP transmits an RTS frame to the STA in the band B (step S1409) and then receives a CTS frame from the STA (step S1410), similarly to the first example.

Further, in a case where the first time period is shorter than the time required to exchange RTS/CTS frames between the AP and the STA (Yes in step S1404) but is equal to or longer than the time required to transmit a CTS frame (No in step S1405), the AP transmits the CTS frame to the AP itself in the band B similarly to the second example (step S1411).

Further, in a case where the first time period is shorter than the time required to transmit a CTS frame (Yes in step S1405), the AP transmits a busy tone in the band B similarly to the fourth example (step S1406).

When the AP acquires the transmission right also in the band A while transmitting a signal based on the length of the first time period required to acquire the transmission right in the band A (step S1407), the present processing then ends.

After the AP acquires the transmission right also in the band A, the AP starts transmission of data to the STA by carrier aggregation in which the band A and the band B are bundled. Here, in a case where a data frame has been transmitted from the AP (step S1408), the AP suspends the transmission of data in the band B and carries out carrier aggregation using the band A and the band B. Further, in a case where a busy tone has been transmitted from the AP (step AS1406), the AP suspends the transmission of the busy tone in the band B and carries out carrier aggregation using the band A and the band B.

According to the processing procedure depicted in FIG. 14, the AP can select an optimum process without wasting the time required to acquire the transmission right in all bands to be used in carrier aggregation.

EXAMPLE 6

In the description of a sixth example, an example is described in which, in the communication system 100 depicted in FIG. 1, the slave station (STA) receives a data frame transmitted from the base station (AP). It is assumed here that the AP transmits a data frame by a method of any one of the first to fifth examples described above.

Figure 15:
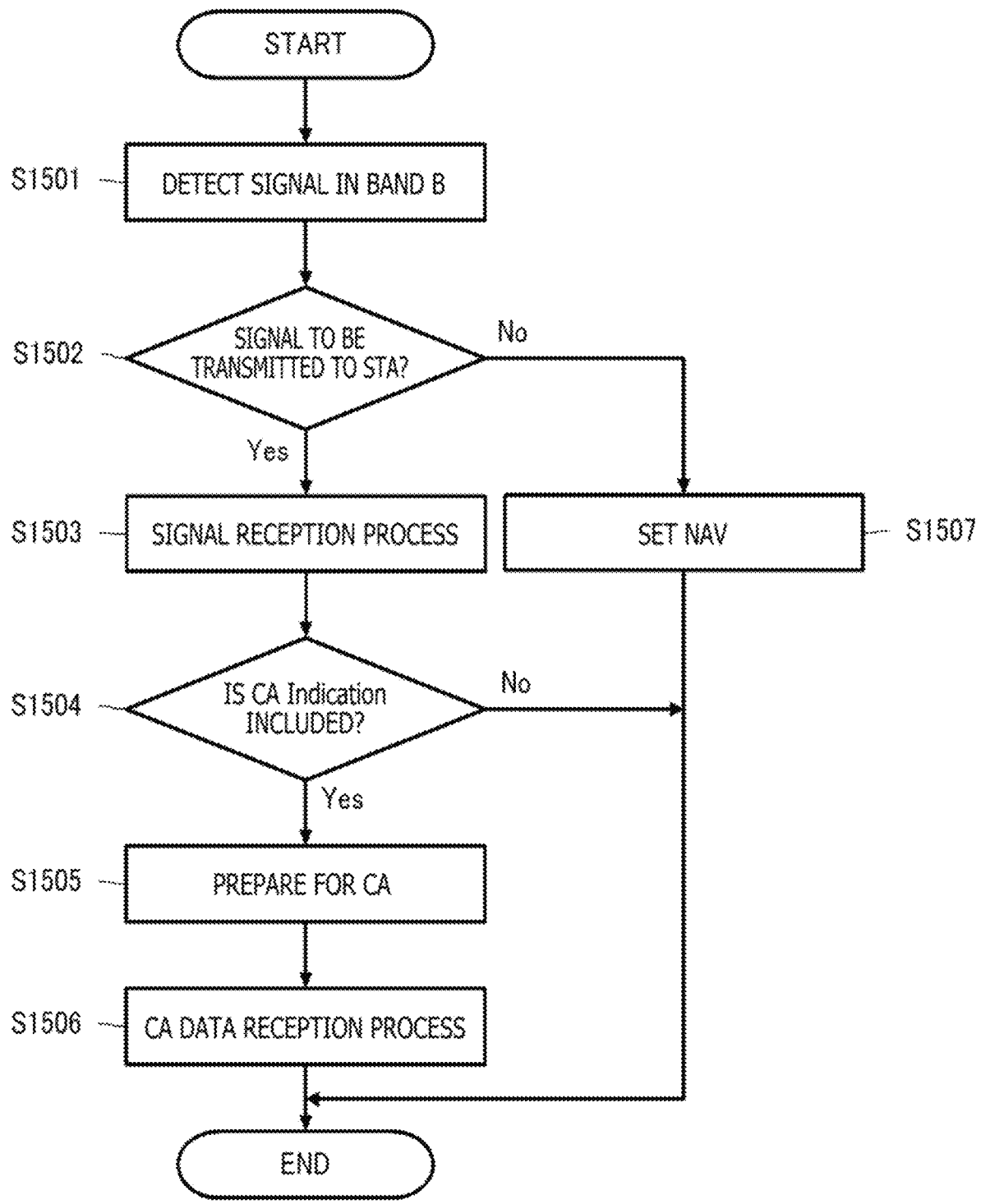
FIG. 15 is a flow chart illustrating a processing procedure that is executed by an STA (sixth example).

FIG. 15 depicts, in the form of a flow chart, an example of a processing procedure executed by the STA in the sixth example. The processing procedure is executed when the communication apparatus 200 depicted in FIG. 2 functions as the STA in the communication system 100 in which two channels of the band A and the band B can be used.

For example, when the STA detects a signal in the band B during waiting for reception in the band B (step S1501), the STA checks whether the signal is to be transmitted to the STA (step S1502).

Here, in a case where the signal detected in the band B is not to be transmitted to the STA (No in step S1502), the STA sets an NAV, for example, on the basis of information of Duration and so forth described in the signal (step S1507), and the present processing then ends without carrying out the succeeding steps.

On the other hand, in a case where the signal detected in the band B is to be transmitted to the STA (Yes in step S1502), the STA performs a process of receiving the signal (step S1503). For example, in a case where the received signal is an RTS frame transmitted from the AP, the STA carries out a process of sending back a CTS frame. Further, in a case where the received signal is a data frame transmitted from the AP, the STA carries out a process of receiving the data frame.

Then, the STA checks whether the received signal includes CA Indication (or information indicating whether or not transmission right acquisition in the band A is being waiting) (step S1504).

In a case where the received signal does not include CA Indication (No in step S1504), after processing of the received signal ends, the STA ends the present processing.

On the other hand, in a case where the received signal includes CA Indication (Yes in step S1504), the STA prepares for carrier aggregation using the band A and the band B (step S1505). For example, in a case where the RF branch for the band A is in a standby state or a sleep state when the STA waits for reception in the band B, the STA makes the RF branch for the band A return to an ordinary operation state to prepare for carrier aggregation using the band A and the band B.

Thereafter, the STA performs a process of receiving data transmitted by carrier aggregation in which the band A and the band B are bundled (step S1506).

The technology disclosed in the present specification has been described in detail in connection with the first to sixth examples. Finally, advantageous effects of the technology disclosed in the present specification are described.

According to the technology disclosed in the present specification, when a communication apparatus transmits data by using multiple bands, even in a case where a timing at which the transmission right is acquired is different from each band, the data can be transmitted without being interrupted by another terminal and without wasting the time required to acquire the transmission right in all bands.

INDUSTRIAL APPLICABILITY

The technology disclosed in the present specification has been described in detail with reference to the specific embodiment. However, it is obvious that modifications and substitutions of the embodiment can be made by those skilled in the art without departing from the subject matter of the technology disclosed in the present specification.

The technology disclosed in the present specification can be applied to a wireless LAN system of, for example, the IEEE 802.11 system, so that multiple bands can efficiently be bundled to acquire a wideband and data communication can be implemented according to a channel access method by CSMA/CA. Needless to say, the technology disclosed in the present specification can also be applied suitably to wireless LAN systems other than that of the IEEE 802.11 system.

In the present specification, although the technology has been described by focusing on the examples in which carrier aggregation is performed upon downlink communication from an access point to a slave station, the subject matter of the technology disclosed in the present specification is not limited to this. For example, the technology disclosed in the present specification can similarly be applied to a case in which carrier aggregation is performed upon uplink communication from a slave station to an access point of a connection destination or a case in which carrier aggregation is performed upon side link communication between terminals.

In other words, the technology disclosed in the present specification has been described in the form of exemplification, and the described substance of the present specification shall not be interpreted restrictively. In order to determine the subject matter of the technology disclosed in the present specification, claims should be referred to.

It is to be noted that the technology disclosed in the present specification can also have the following configurations.

(1)

A communication apparatus including:

a communication section that performs transmission and reception of a wireless signal by using multiple bands; and a control section that controls communication operation of the communication section, in which the control section performs control such that, after a transmission right has been acquired in a first band, a first signal is transmitted in the first band before a transmission right is acquired in a second band.

(2)

The communication apparatus according to (1) above, in which the control section performs control such that information regarding transmission right acquisition in another band is included in the first signal.

(3)

The communication apparatus according to (2) above, in which the information regarding the transmission right acquisition in the other band includes information indicating whether or not the transmission right acquisition in the other band is being waiting or information of a band in which the transmission right is not acquired yet.

(4)

The communication apparatus according to (1) above, in which the control section performs control such that, when the transmission rights are acquired in both the first band and the second band, data transmission is performed by using the first band and the second band simultaneously.

(5)

The communication apparatus according to any one of (1) to (4) above, in which the control section performs control such that an RTS frame for requesting transmission is transmitted as the first signal.

(5-1)

The communication apparatus according to (5) above, in which the control section performs control such that, after a CTS frame for permitting transmission is received in the first band in response to the RTS frame, data transmission is started by using the first band and the second band simultaneously.

(6)

The communication apparatus according to (5) above, in which the control section performs control such that securing of the transmission right in the first band is suspended in a case where the second band is placed into a busy state in the middle of exchange of the RTS frame and a CTS frame in the first band or after the exchange of the frames is completed.

(7)

The communication apparatus according to any one of (1) to (3) above, in which the control section performs control such that a CTS frame for permitting transmission is transmitted as the first signal.

(7-1)

The communication apparatus according to (7) above, in which the control section transmits a CTS-to-self frame as the first signal.

(8)

The communication apparatus according to any one of (1) to (3) above, in which the control section performs control such that a data frame is transmitted as the first signal.

(9)

The communication apparatus according to (8) above, in which the control section performs control such that, after the transmission right in the second band is acquired, data transmission in the first band is suspended.

(9-1)

The communication apparatus according to (9) above, in which the control section performs control such that data transmission in the first band is suspended immediately after the transmission right in the second band is acquired.

(9-2)

The communication apparatus according to (9) above, in which the control section performs control such that, after the transmission right in the second band is acquired, data transmission only in the first band is continued until a certain period of time during which a terminal as a transmission destination can decode data in the middle of processing elapses, and is then ended.

(9-3)

The communication apparatus according to (9-2) above, in which the certain period of time is an end of an A-MPDU sub frame of an A-MPDU or a block unit of an LDPC code.

(10)

The communication apparatus according to any one of (1) to (3) above, in which the control section performs control such that a busy tone is transmitted as the first signal.

(11)

The communication apparatus according to (10) above, in which the busy tone includes information regarding time at which the communication apparatus is to transmit a data signal.

(12)

The communication apparatus according to (10) or (11) above, in which the busy tone includes network identification information.

(12-1)

The communication apparatus according to any one of (10) to (12) above, in which the busy tone includes a signal pattern common to a signal pattern of another system.

(13)

The communication apparatus according to any one of (1) to (3) above, in which the control section transmits the first signal based on time required to acquire the transmission right in the second band.

(14)

The communication apparatus according to (13) above, in which the control section performs control such that a data frame is transmitted as the first signal in a case where the time required to acquire the transmission right in the second band is equal to or longer than time required to transmit a minimum unit of decodable data.

(15)

The communication apparatus according to (13) above, in which the control section performs control such that an RTS frame is transmitted as the first signal in a case where the time required to acquire the transmission right in the second band is equal to or longer than time required to carry out exchange of the RTS frame and a CTS frame.

(16)

The communication apparatus according to (13) above, in which the control section performs control such that a CTS frame is transmitted as the first signal in a case where the time required to acquire the transmission right in the second band is shorter than time required to carry out exchange of an RTS frame and the CTS frame but is equal to or longer than time required to transmit the CTS frame.

(17)

The communication apparatus according to (13) above, in which the control section performs control such that a busy tone is transmitted as the first signal in a case where the time required to acquire the transmission right in the second band is shorter than time required to transmit a CTS frame.

(18)

A communication method for a communication apparatus that performs transmission and reception of a wireless signal by using multiple bands, the communication method including:

a step of acquiring a transmission right in a first band;

a step of transmitting a first signal in the first band before a transmission right is acquired in a second band; and a step of performing data transmission by simultaneously using the first band and the second band when the transmission rights are acquired in both the first band and the second band.

(19)

A communication apparatus including:

a communication section that performs transmission and reception of a wireless signal by using multiple bands; and a control section that controls communication operation of the communication section, in which the control section performs control such that, after a first signal has been received in the first band, data transmitted by simultaneously using the first band and the second band is received.

(20)

A communication method for a communication apparatus that performs transmission and reception of a wireless signal by using multiple bands, the communication method including:

a step of receiving a first signal in a first band; and a step of receiving data transmitted by using the first band and a second band simultaneously.

REFERENCE SIGNS LIST

200: Communication apparatus
210: Control section
220: Power supply section
230: Communication section
231: Wireless controlling section
232: Data processing section
233: Modulation-demodulation section
234: Signal processing section
235: Channel estimation section
236: Wireless interface section
237: Amplification section
240: Antenna section

The invention claimed is:

1. A communication apparatus comprising:
a communication circuit that performs transmission and reception of a wireless signal by using multiple bands; and
a control circuit that controls communication operation of the communication circuit, wherein
the control circuit performs control such that, after a transmission right has been acquired in a first band, a first signal is transmitted in the first band before a transmission right is acquired in a second band and based on a time required to acquire the transmission right in the second band,
wherein the control circuit performs control such that a data frame is transmitted as the first signal in a case where the time required to acquire the transmission right in the second band is equal to or longer than a time required to transmit a minimum unit of decodable data.

2. The communication apparatus according to claim 1, wherein
the control circuit performs control such that information regarding transmission right acquisition in another band is included in the first signal.

3. The communication apparatus according to claim 2, wherein
the information regarding the transmission right acquisition in the other band includes information indicating whether or not the transmission right acquisition in the other band is being waiting or information of a band in which the transmission right is not acquired yet.

4. The communication apparatus according to claim 1, wherein
the control circuit performs control such that, when the transmission rights are acquired in both the first band and the second band, data transmission is performed by using the first band and the second band simultaneously.

5. The communication apparatus according to claim 1, wherein
the control circuit performs control such that a request to send (RTS) frame for requesting transmission is transmitted as the first signal.

6. The communication apparatus according to claim 5, wherein
the control circuit performs control such that securing of the transmission right in the first band is suspended in a case where the second band is placed into a busy state in a middle of an exchange of the RTS frame and a clear to send (CTS) frame in the first band or after the exchange of the RTS and CTS frames is completed.

7. The communication apparatus according to claim 1, wherein
the control circuit performs control such that a clear to send (CTS) frame for permitting transmission is transmitted as the first signal.

8. The communication apparatus according to claim 1, wherein
the control circuit performs control that a data frame is transmitted as the first signal.

9. The communication apparatus according to claim 8, wherein
the control circuit performs control such that, after the transmission right in the second band is acquired, data transmission in the first band is suspended.

10. The communication apparatus according to claim 1, wherein
the control section circuit performs control such that a busy tone is transmitted as the first signal.

11. The communication apparatus according to claim 10, wherein
the busy tone includes information regarding time at which the communication apparatus is to transmit a data signal.

12. The communication apparatus according to claim 10, wherein
the busy tone includes network identification information.

13. The communication apparatus according to claim 1, wherein
the control circuit performs control such that a request to send (RTS) frame is transmitted as the first signal in a case where the time required to acquire the transmission right in the second band is equal to or longer than time required to carry out an exchange of the RTS frame and a clear to send (CTS) frame.

14. The communication apparatus according to claim 1, wherein
the control circuit performs control such that a clear to send (CTS) frame is transmitted as the first signal in a case where the time required to acquire the transmission right in the second band is shorter than time required to carry out exchange of a request to send (RTS) frame and the CTS frame but is equal to or longer than time required to transmit the CTS frame.

15. The communication apparatus according to claim 1, wherein
the control circuit performs control such that a busy tone is transmitted as the first signal in a case where the time required to acquire the transmission right in the second band is shorter than time required to transmit a clear to send (CTS) frame.

16. A communication method for a communication apparatus that performs transmission and reception of a wireless signal by using multiple hands, the communication method comprising:
acquiring a transmission right in a first band
after the transmission right has been acquired in the first band, transmitting a first signal in the first band before a transmission right is acquired in a second hand and based on a time required to acquire the transmission right in the second band,
wherein the transtnittin2 includes transmitting a data frame as the first signal in a case where the time required to acquire the transmission right in the second hand is equal to or longer than a time required to transmit a minimum unit of decodable data.

17. The communication method according to claim 16, wherein the transmitting comprises:
transmitting request to send (RTS) frame as the first signal in a case where the time required to acquire the transmission right in the second band is equal to or longer thantime required to carry out an exchange of the RTS frame and a clear to send (CTS) frame, or
transmitting a clear to send (CTS) frame as the first signal in a case where the time required to acquire the transmission right in the second band is shorter than time required to carry out exchange of a request to send (RTS) frame and the CTS frame but is equal to or lonuer than time required to transmit the CTS frame, or
transmitting a busy tone as the first signal in a case where the time required to acquire the transmission right in the second band is shorter than time required to transmit a clear to send (CTS) frame.

* * * * *